United States Patent [19]

Yamaguchi et al.

[11] Patent Number: 5,675,391
[45] Date of Patent: Oct. 7, 1997

[54] CONTRAST/BRIGHTNESS CONTROL CIRCUIT FOR TELEVISION RECEIVER

[75] Inventors: Koichi Yamaguchi; Teturou Onda, both of Saitama-ken, Japan

[73] Assignee: Kabushiki Kaisha Toshiba, Kawasaki, Japan

[21] Appl. No.: 408,619

[22] Filed: Mar. 23, 1995

[30] Foreign Application Priority Data

Mar. 23, 1994 [JP] Japan .................... 6-051992

[51] Int. Cl.$^6$ .................... H04N 5/45; H04N 5/57
[52] U.S. Cl. .................... 348/565; 348/673
[58] Field of Search .................... 348/578, 588, 348/563, 687, 564, 688, 565, 689, 566, 673, 584, 586; H04N 5/45, 5/445, 5/57

[56] References Cited

U.S. PATENT DOCUMENTS

| | | | |
|---|---|---|---|
| 4,947,253 | 8/1990 | Neal | 358/174 |
| 4,965,669 | 10/1990 | Canfield et al. | 358/171 |
| 5,204,748 | 4/1993 | Lagoni | 358/169 |

FOREIGN PATENT DOCUMENTS

| | | | |
|---|---|---|---|
| 0 443 064 | 8/1991 | European Pat. Off. | |
| 0 621 729 | 10/1994 | European Pat. Off. | |
| 6053507 | 11/1985 | Japan . | |
| 0263984 | 11/1991 | Japan | H04N 5/45 |

OTHER PUBLICATIONS

Patent Abstracts of Japan, vol. 16, No. 73 (E-1169), Feb. 21, 1992 & J P-A-03 263984 (Matsushita Electric Ind Co) 25 Nov. 1991.
Patent Abstracts of Japan, vol. 17, No. 317 (E-1382, Jun. 16, 1993 & JP-A-05 030442 (Fujitsu General Ltd) Feb. 1993.
Patent Abstracts of Japan, vol. 12, No. 369 (E-665), Oct. 4, 1988 & JP-A-63 121366 (Sony Corp) May 25, 1988.
Patent Abstracts of Japan, vol. 10, No. 8 (E-373), Jan. 14, 1986 & JP-A-60 172891 (Matsushita Denki Sangyo KK) Sep. 6, 1985.
Patent Abstracts of Japan, vol. 10, No. 8 (E-373), Jan. 14, 986 & JP-A-60 171875 (Matsushita Denki Sangyo KK) Sep. 5, 1985.
Patent Abstracts of Japan, vol. 18, No. 234 (E-1543), Apr. 28, 1994 & JP-A-06 022238 (Matsushita Electric Ind Co) Jan. 28, 1994.
Patent Abstracts of Japan, vol. 27, No. 575 (E-1449), Oct. 20, 1993 & JP-A-05 167946 (Matsushita Electric Ind Co) Jul. 2, 1993.

*Primary Examiner*—David E. Harvey
*Attorney, Agent, or Firm*—Cushman Darby & Cushman IP Group of Pillsbury Madison & Sutro, LLP

[57] ABSTRACT

The invention is subjected for a television receiver which is capable of simultaneously displaying a picture signal by at least first and second picture images on a cathode ray tube and including means for generating the first and second picture signal, a superimposer for selectively supplying the first and second picture signal to the cathode ray tube, an APL detector for receiving the first and second picture signals to detect respective average picture levels of the first and second picture signals respectively thus producing first and second level detection signals, an ABL detector for generating a detection voltage responsive to a variation in an anode current of the cathode ray tube, and control means for controlling at least one of contrasts and brightnesses of the first end second picture signals by commonly operating on the first and second picture signals in response to the detection voltage from the ABL detector as well as for independently controlling at least one of contrasts and brightnesses of the first and second picture signals in response to the first and second detection signals from the APL detector.

4 Claims, 6 Drawing Sheets

CONTRAST/BRIGHTNESS CONTROL CIRCUIT FOR TELEVISION RECEIVER

FIELD OF THE INVENTION

The present invention generally relates to a television receiver capable of synchronously displaying a plurality of images on a cathode ray tube, and more particularly to a television receiver capable of improving balances of contrasts and/or brightnesses of the plurality of images.

BACKGROUND OF THE INVENTION

Recently, a picture-in-picture system which is able to display a main picture and a sub picture by superimposing the sub picture on the main picture so as to allow a viewer to simultaneously enjoy two programs, has become popular.

FIG. 1 is a block diagram showing such a conventional television receiver.

In FIG. 1, a numeral 71 denotes an input terminal for receiving a picture signal a5 for a main pitcture display region from a first tuner. The picture signal a5 led to the input terminal 71 is further led to a first picture signal processor 72. The first picture signal processor 72 performs a picture signal processing such as a picture amplification to the picture signal a5 for the main picture display region, converts the signal into a picture signal b5 which able to he displayed on the cathode ray tube, and supplies it to a superimposer 73.

On the other hand, a picture signal c5 for a sub pitcture display region output from by a second tuner is led to an input terminal 81. The picture signal c5 led to the input terminal 81 is led a second picture signal processor 82. The second picture signal processor 82 performs picture signal processings such as a picture amplification and a picture compression on the picture signal c5 for the sub pitcture display region, converts the signal c5 into a picture signal d5 which is able to be displayed on the cathode ray tube, and supplies it to the superimposer 73.

The superimposer 73 superimposes the picture signal d5 from the second picture signal processor 82 in place of the picture signal b5 from the first picture signal processor in a sub pitcture display region, then supply a contrast adjuster 74 with the superimposed signal as a picture signal e5. The contrast adjuster 74 adjusts the contrast of the picture signal e5 from the superimposer 73 using a contrast adjusting voltage Vc5 (described later) received on its control signal input terminal so as to supply a cathode ray tube (referred to as CRT hereinafter) with the signal as a picture signal g5. A brightness adjuster V5 adjusts the brightness of the picture signal f5 from the contrast adjuster V4 using a brightness adjusting voltage Vb5 (described later) so as to supply a cathode of the cathode ray tube (hereinafter referred to as CRT) from the contrast adjuster 74 with the picture signal as a picture signal g5 to be displayed.

On the other hand, a current voltage V51 from a power supply line is led to a power supply voltage input terminal 77. The power supply voltage input terminal 77 is connected to an anode of a CRT 78 via a series connection of a resistor R51, a resistor R52, a secondary winding 552 of a flyback transformer 80, and an anode-to-cathode path. The connection node of the resistor R52 and the secondary winding L52 is connected to a reference potential source via a smoothing condenser C51.

According to such a circuit arrangement, a pulse voltage induced across the secondary winding L52 of the flyback transformer 80 is subjected for a rectification and a smoothing at a rectification/smoothing circuit comprised of a diode D51 and a stray capacitance around the anode and then supplied to the anode of the CRT 76.

On the other hand, a control voltage input terminal the contrast adjuster V4 is connected to the anode of a diode D52 via a resistor R53, and also connected to a movable contact of a variable resistor VR51 used as a contrast adjusting volume. The cathode of the diode D52 is connected to a connection node between the resistor RS1 and the resistor R52. A reference voltage V52 is led to an input terminal 78. The input terminal 78 is connected to the reference potential source via the variable resistor VR51. According to such a connection, the contrast adjuster 74, the resistor R53, the diode D52 and the variable resistor VR51 are constituting an automatic contrast limiting circuit.

On the other hand, a control voltage input terminal the brightness adjuster 75 is connected to an anode of diode D53, and also connected to a movable contact of a variable resistor VR52. A cathode of the diode D53 is connected to a connection node between the resistor R51 and the resistor R52. A reference voltage V53 is led to an input terminal 79. The input terminal 79 is connected to the reference potential source via the variable resistor VR52. According to such a circuit arrangement, the brightness adjuster 75, a resistor R54, the diode D53, and the variable resistor VR52 constitute an automatic brightness limiting circuit.

Here, a current flows into the anode of the CRT 78 from a terminal 77 through the resisters R51, R52, the flyback transformer 80, and the diode D51. The more the anode current increases, the more a voltage in the connection node between the resistor R51 and the resistor R52 decreases. When the voltage on the connection node between the resistor R51 and the resistor R52 decreases below a prescribed value, the diode D52 and the diode D53 become conductive, and the voltage Vc5 and Vb5 decrease as the anode current increases, then they control the contrast adjuster 74 and the brightness adjuster 75, so as to control the contrast and the brightness of the picture signal.

To that end, the voltage Vc5 decreases as the position of the movable contact of the variable resistor VR51 is shifted toward the side of the reference potential source, while it increases as the position of the movable contact of the variable resistor VR51 is shifted toward the side of the power supply voltage input terminal 78. Further, when the current flowing through the anode of the CRT 76 exceeds a fixed value A1 defined by the position of the moving contact of the variable resistor VR51, the voltage Vc5 decreases as the current glows through the anode of the CRT 76 increases, while it increases as the current flowing through the anode of the CRT 76 decreases.

The voltage Vb5 applied to the control voltage input terminal of the brightness adjuster 75 decreases as the position of moving contact the variable resistor VR52 is shifted toward the side of the reference potential source, while it increases as the position of the moving contact of the variable resistor VR52 is shifted toward the side of the power supply voltage input terminal 79. Further, in a case that the current flowing through the anode of the CRT 76 exceeds a fixed value defined by the position of the moving contact of the variable resistor VR52, while the voltage Vb5 increase when the current flowing through the anode of the CRT 76 decreases.

According to such a conventional television receiver, the picture signals a5 and c5 supplied to the input terminals 71 and 81 are each converted into picture signals b5 and d5 capable of being displayed on the cathode ray tube by the first picture signal processor 72 and the second picture signal processor 82. Further they are converted into the picture signal e5 by the superimposer 73. The picture signal e5 is subjected for the contrast adjustment based on the voltage Vc5 by the contrast adjuster 74 as well as for the brightness adjustment based on the voltage Vb5 by the brightness adjuster 75, then they are displayed on the CRT 76.

FIG. 2 is a graph showing a relation of an average picture level (hereinafter refereed to as the APL) of the picture signal e5 from the superimposer 73 and the anode current of the CRT 76 of such a conventional television receiver. In FIG. 2 the vertical axis shows the anode current of the CRT 76, while the horizontal axis shows the APL of the picture signal e5.

As shown in FIG. 2, when the anode current of the CRT 76 is smaller than a prescribed value A1 (level-point D1, for instance) it increases at a prescribed inclination as the APL increases, or it decreases with the prescribed inclination as the APL decreases.

The voltages Vc5 and Vb5 supplied to the contrast adjuster 74 and the brightness adjuster 75 decrease to cope with increasing of the current flowing into the anode of the CRT 78 which go to exceed the prescribed value A1. Thus the contrast adjuster 74 and the brightness adjuster 75 decrease the contrast and the brightness of the picture signal while decreasing the current flowing through the CRT 76. So, when the APL rises from the level-point D2 to the level-point D3, the contrast adjuster 74 and the brightness adjuster 75 decrease the contrast and the brightness of the picture signal. As a result, the current flowing through the anode of the CRT 76 is controlled to reach the prescribed value A1.

According to such a conventional television receiver, when a plurality of pictures (for instance a main picture and a sub picture) are simultaneously displayed on the CRT 76, the anode current varies in response to the main picture signal and the child picture signal since the picture image supplied to the CRT 76 units two picture signals. So, the APL of one picture signal varies in great deal the other picture signal is affected by the operation of the automatic contrast limiting circuit and the automatic brightness limited circuit.

For instance, thinking of the case that the APL of the main picture signal increases while the APL of the child picture image remaining at a low level, the anode current rises as the main picture APL increases and the automatic contrast and the automatic brightness controls are limited by the operation of the automatic contrast limiting circuit and the automatic brightness limited circuit. However, since the APL of the sub picture signal remaining at the low level a displayed picture becomes excessively darker more than it required, when the sub picture contrast and brightness are limited.

In particular, when the main picture and the sub picture are displayed on same size regions on the CRT the variation in one APL effects more to that of the other APL.

As described above, such a conventional television receiver as mentioned above has a problem that since the contrast and the brightness are controlled after superimposing the picture signals of a plurality of pictures when the current flowing into an anode of a cathode ray tube being limited, when at least one of average picture levels of the plurality of picture signals would varied at a rate different from the others, the contrast and the brightness excessively decrease more than it required thus extremely worsening a quality of displayed picture.

SUMMARY OF THE INVENTION

It is, therefore, an object of the present invention to provide a television receiver which overcomes the problem of the conventional television receiver.

Another object of the present invention is to provide a television receiver is able to prevent the contrast and the brightness from worsening lower than it required on the displayed picture of the picture signal which is less varied the average picture level when at least one of average picture levels of the plurality of picture signal varied at a rate different from the others.

In order to achieve the above object, a television receiver according to one aspect of the present invention is subjected to the one which is capable of simultaneously displaying a picture signal by at least first end second picture images on a cathode ray tube, and including means for generating the first and second picture signal, a superimposer for selectively supplying the first and second picture signal to the cathode ray tube, an APL detector for receiving the first end second picture signals to detect respective average picture levels of the first end second picture signals respectively thus producing first and second level detection signals, an ABL detector for generating a detection voltage responsive to a variation in an anode current of the cathode ray tube, and control means for controlling at least one of contrasts and brightnesses of the first and second picture signals by commonly operating on the first and second picture signals in response to the first and second detection signals from the ABL detector, as well as for independently controlling at least one of contrasts end brightnesses of the first and second picture signals in response to the first and second detection signals from the APL detector.

According to the television receiver having such an arrangement, the control means operates in common on the first and the second picture signals in response to the detection voltage from the ABL detector. Then the control means not only controls at least one of contrasts and brightnesses of the first and the second picture signals, but also independently controls at least one of the contrasts and the brightnesses of the first and the second picture signals in response to the first and the second detection signals from the APL detector. Then as the superimposer selectively supplies the first and second picture signals to the cathode ray tube, the present invention can prevent the contrast and the brightness from excessive decreasings lower then it required on the displayed picture of the picture signal of the less varied average picture level when at least of one of the average picture levels of the plural picture signal varies at a rate different from others.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained is the same becomes better understood by reference to the following detailed description when considered in connection with the accompanying drawings, wherein.

DESCRIPTION OF THE PREFERRED EMBODIMENTS

Embodiments of the television receiver according to the present invention will be explained hereinafter in reference to the drawings.

Figure 3:
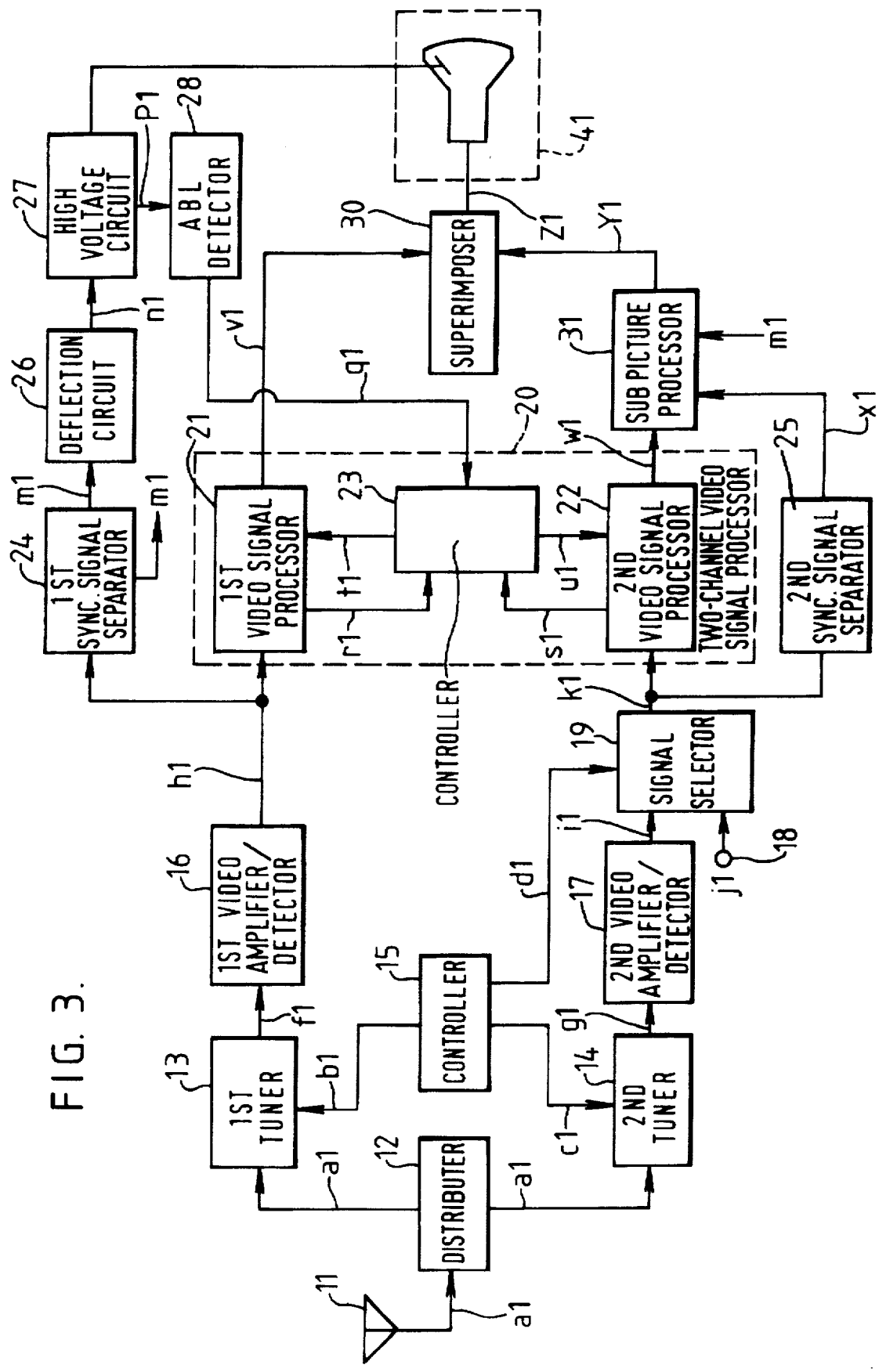
FIG. 3 is a block diagram showing a first embodiment of the television receiver according to the present invention.

FIG. 3 is a block diagram showing one embodiment of the television receiver according to the present invention.

In FIG. 8 a numeral 11 denotes an antenna of the television receiver. A high frequency signal (hereinafter referred to as RP signal) a1 induced on the antenna 11 is applied by a distributor to both of a first tuner 13 and a second tuner 14.

A controller 15 generates channel selection control signal b1 and c1 which control channel selections for signals to be displayed on a main pitcture display region or a sub picture display region based on a key input through operation keys on a television receiver cabinet, or operation keys on a remote controller, supplies the signal to the first tuner 13 and the second tuner 14. The controller 18 then supplies a signal selector 19 with an input selection signal d1 for selecting a picture signal to be displayed on the sub pitcture display region among picture signals originated from television broadcasting channels and external input terminals a between a picture signal for television broadcast or the picture signal from external input terminals.

The first and second tuners 13 and 14 respectively select the RF signal a1 based on the channel selection control signals b1, c1. Then intermediate frequency signals f1, g1 of two selected input RF signals selected in response to the channel selection control signals b1, c1 are respectively led to first and second video amplifier/detectors 16, 17. The first video amplifier/detector 18 performs the video amplification and the detection on the intermediate frequency signal f1 from the first tuner 13 and then supplies a composite video signal h1 thus obtained to a first video signal processor 21 in a two-channel video signal processor 20 as well as to a first sync. signal separator 24. The second video amplifier/detector 17 also performs the video amplification and the detection on the intermediate frequency signal g1 from the second tuner 14 and then supplies a composite video signal i1 thus obtained to a second video signal processor 22 in the two-channel video signal processor 20 via the signal selector 19. A second input terminal of the signal selecting circuit 19 is connected to an external input terminal 18 for receiving a composite video signal j1 from a video tape recorder. The signal selector 19 selectively supplies the composite video signals i1, j1 on its first and second input terminals to the second video signal processor 22 in the two-channel video signal processor 20 with, based on an input selection signal d1 from a controller 15, and also to a second sync. signal separator 25.

The first sync. signal, separator 24 separates horizontal and vertical sync. signals m1 from the composite video signal h1 supplying to the first sync. signal separator 24 and supplies the sync. signals m1 to a deflection circuit well as a sub picture processor 31 as will be described later.

The deflection circuit 76 supplies a deflection current to a deflection yoke (not shown) of a CRT 41, based on the horizontal and vertical sync. signals m1, and then supplies a flyback pulse n1 generated within a retrace period of a saw tooth current to be supplied to a horizontal deflection coil of the deflection yoke to a high voltage circuit 27. The high voltage circuit 27 includes a flyback transformer for receiving the flyback pulse n1. Thus the high voltage circuit 27 generate a high DC voltage by rectifying the output of the flyback transformer. The high DC voltage is then supplied to the anode of the CRT 41. The high voltage circuit 27 is also connected to an ABL detector 28. The ABL detector 28 generates an ABL detection voltage (hereinafter simply referred to as detection voltage) representing a variation in the anode current of the CRT 41. The detection voltage q1 from the ABL detector 28 is supplied to a controller 23 of the video signal processor 20.

The video signal processor 20 has first and second video signal processors 21 and 22, each containing an APL detector as will be described later, in addition to a controller 23. The controller 23 receives the detection voltage q1, and signals r1, s1 which are the result of the APL detection. The controller 23 then supplies first and second contrast/brightness control signals t1 and u1 to the first and second video signal processors 21, 22, respectively.

The first video signal processor 21 performs a video signal processing such as the picture amplification to the composite video signal h1 from the first picture amplification detector 16, generating the picture signal for the main picture display region, detecting the APL on the picture signal for the main pitcture display region, generating the APL signal r1 of the detection result, supplying the signal to the controller 23, adjusting of the contrast and the brightness to the picture signal for the main pitcture display region based on the first contrast/brightness control signal t1, generating a picture signal v1 which can display on the picture tube, and supplying the picture signal v1 to a superimposer 30.

The second video signal processor 22 performs picture signal processing such as the picture amplification on the composite video signal k1 from the picture selecting circuit 19, generating the picture signal for the sub pitcture display region, detecting the APL on the picture signal for the sub picture display region, generating the APL signal s1 of the detection result, supplying the signal to the controller 23, adjusting of the contrast and the brightness to the picture signal for the sub picture display region based on the second contrast/brightness control signal u1, generating a picture signal w1 which can display on the picture tube, and supplying the picture signal w1 to the sub picture processor 31. The second sync. signal separator 25 separates a horizontal and vertical sync. signal x1 from the composite video signal k1 which is supplied to the second sync. signal separator 25 and then supplies the picture signal k1 to the sub picture processor 31.

The sub picture processor 31 reads one (1) frame at a time of the picture signal w1 from the second video signal processor 22 based on the horizontal an vertical sync. signal x1, generating a picture signal y1 for the sub pitcture display region synchronized to the picture signal v1 from the first video signal processor 21 by thinning the frame of the picture signal in its horizontal and vertical directions based on the horizontal and vertical sync. signals m1 from the first sync. signal separator 24, and then supplying the picture signal y1 to the superimposer 30.

The superimposer 30 selectively superimposes the picture signal y1 from the sub picture processor 31 for the sub pitcture display region on the picture signal v1 from the first video signal processor 21 for the main pitcture display region. Then the superimposed picture signal z1 thus obtained is supplied to the cathode of the CRT 41. The CRT 41 displays the picture signal z1 from the superimposer 30 under a control of a deflection current from the deflection circuit 26, which is based on the horizontal and vertical sync. signals m1, applied to the deflection yoke.

The operation of the first embodiment will be explained hereinafter.

First, the operations for displaying the first channel television broadcasting program on the main pitcture display region while for displaying the second channel television broadcasting on the sub picture display region will be described.

In this case, the controller 15 performs of generating the channel selection control signals b1 and c1 for controlling the selections of the first and second channels, supplying the control signals b1 and c1 to the first and second tuners 13 and 14, and supplying the input selection signal d1 indicating the television broadcasting picture signal to be displayed in the sub pitcture display region to the signal selecting circuit 19.

Accordingly, the RF signal a1 from the antenna 11 is channel selected by the first and second tuners 13 and 14, the selected channels being converted into the composite video signals h1 and i1 by the first and second picture amplification/detectors 16 and 17, supplied to into the first and second video signal processors 21 and 22 and then supplied to the first and second sync. signal separator 24 and 25.

The first sync. signal separator 24 separates the horizontal and vertical sync. signals m1 from the composite video signal h1 which is supplied to the first sync. signal separator 24 and supplies the signals m1 to the deflection circuit 26. The deflection circuit 26 supplies the flyback pulse n1 generated within the retrace period of the saw tooth current which is sent to the horizontal deflection coil based on the horizontal and vertical sync. signals m1. According to this, the high voltage circuit 27 supplies a current to the anode of the CRT 41. The ABL detector 28 detects the voltage which varies in response to the anode current of the CRT 41 and supplies the detection voltage q1 to the controller 23.

On the other hand, the first video signal processor 21 detects the APL on the composite video signal h1 from the first picture amplification detector 16, generating the APL signal r1 of the detection result and then supplies the signal r1 to the controller 23. The second image processor 22 also performs of detecting the APL on the composite video signal k1 from the signal selecting circuit 19, generating the APL signal e1 of the detection result and then supplying the signal s1 to the controller 23.

The controller 23 generates the first contrast/brightness control signal t1 which response to the detraction signal q1 from the ABL detector 28 and the first APL signal f1, generates the signal t1 to the first video signal processor 21, generates the second contrast/brightness control signal u1 which responds to the detection signal q1 and the second APL signal s1 and then provides the signal u1 to the second video signal processor 22. In this case, the control signals t1 and u1 control the contrast and the brightness when the anode current or the APL increases.

The first video signal processor 21 adjusts the contrast/brightness to the picture signal of the composite video signal h1 after the picture signal processing based on the contrast/brightness control signal t1, generates the picture signal v1 and then provides it to the superimposer 30. The second video signal processor 22 then adjusts the contrast and brightness to the picture signal of the composite video signal k1 after the picture signal processing based on the contrast/brightness control signal u1 provided as such, generates the picture signal w1, converts it to the picture signal y1 for the sub pitcture display region via the sub picture processor 31 and then supplies the signal y1 to the superimposer.

The superimposer 30 superimposes the picture signals v1 and y1 to from a picture signal z1 and displays on the CRT 41.

Next, the operations for displaying the first channel television broadcasting program on the main pitcture display region while for displaying the composite video signal from the external input terminal 18 on the sub pitcture display region will be described.

In this case, the controller 15 supplies the input selection signal d1 for directing the display of the composite video signal j1 from the external input terminal 18 on the sub pitcture display region to the signal selecting circuit 19. Thus the composite video signal j1 from the external input terminal 18 is supplied to the second video signal processor 22 as the composite video signal k1 through the signal selecting circuit 19. Operations other than the above are same as those in the case that the second channel television broadcasting is displayed on the sub pitcture display region.

According to the embodiment, the first and the second video signal processors 21 and 22 independently adjusts the gain of the contrast/brightness to the composite video signals h1 and k1 for the main pitcture display region and sub pitcture display region based on the APLs presented by the first and the second APL signals r1 and s1, then the superimposer 30 superimposes the picture signals v1 and w1 performed such adjustments. Accordingly, the present invention can prevent the contrast and the brightness from decreasing lower than it required on the picture with the less variation of the APL when the APL of one of the composite video signals h1 and k1 for the main picture display region and the sub pitcture display region varies at a rate different from the other.

Figure 4:
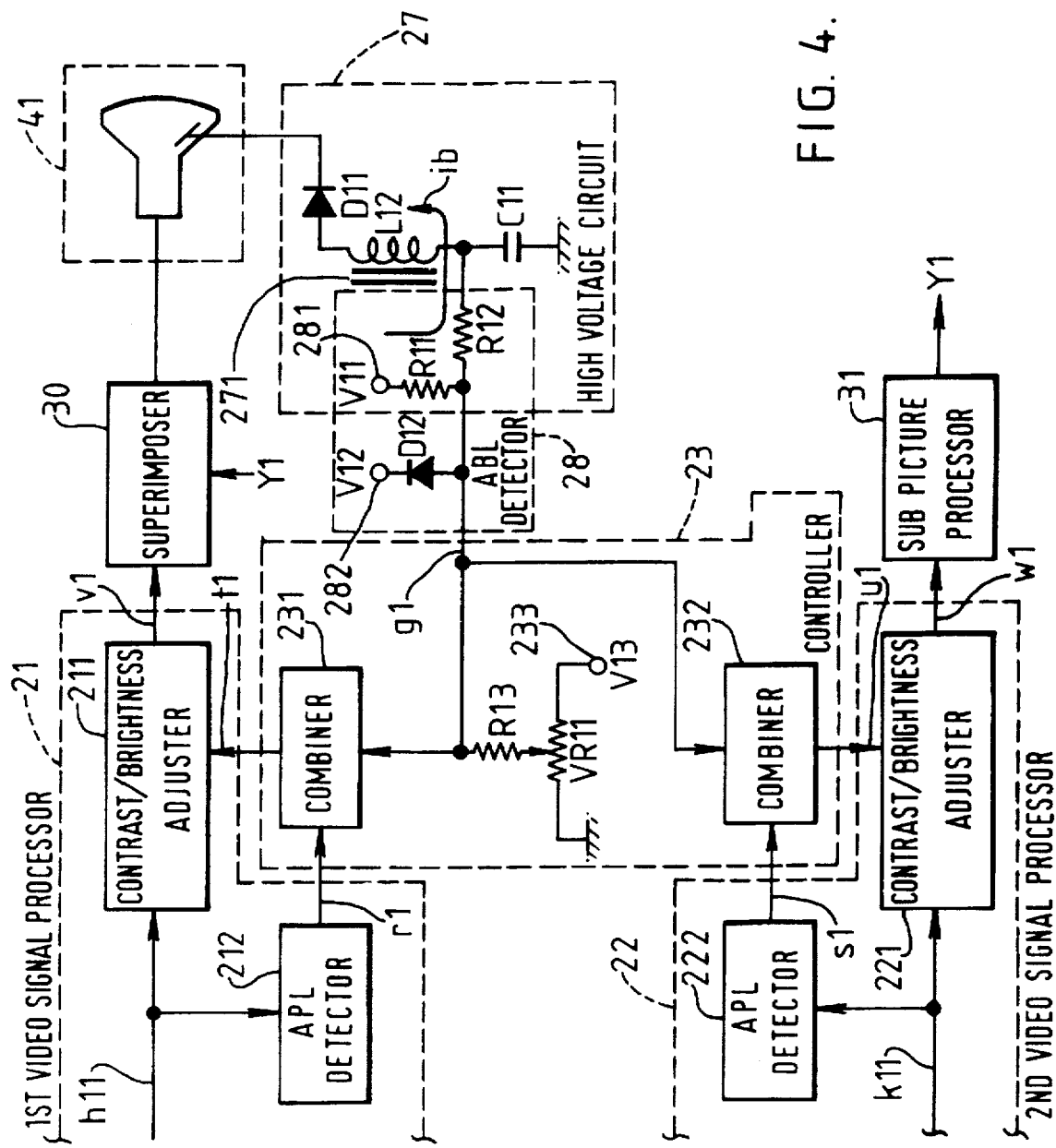
FIG. 4 is a block diagram showing a principal portion of the embodiment of FIG. 7 in detail.

FIG. 4 is a block diagram showing the detail of principal portions of the embodiment of FIG. 3.

In FIG. 4, the first video signal processor 21 performs picture signal processing such as a picture amplification to the composite video signal h1 from the first picture amplification detector 16 shown in FIG. 3, generating the picture signal h11 for the main pitcture display region, detecting the APL by an APL detector 212 on the picture signal h11 for the main pitcture display region, generating the APL signal r1 of the detecting result, supplying the signal r1 to the first input terminal of a combiner 231 of the controller 23, adjusting the contrast and the brightness by a contrast/brightness adjuster 211 based on the first contrast/brightness control signal t1 to the picture signal h11 for the main pitcture display region region, generating the picture signal v1 capable of displaying in the cathode ray tube, and supplying the signal v1 to the superimposer 30.

The second video signal processor 22 also performs picture signal processing such as the picture amplification to the composite video signal k1 from the signal selecting circuit 10 shown in FIG. 3, generating the picture signal k11 for the sub pitcture display region, detecting the APL by an APL detector 222 on the picture signal k11 for the sub pitcture display region, generating the APL signal s1 of the detecting result, supplying the signal s1 to the first input terminal of a combiner 232 of the controller 23, adjusting by a contrast/brightness adjuster 221 based on the first contrast/brightness control signal u1 to the picture signal k11 for the sub pitcture display region, generating the picture signal w1 capable of displaying in the cathode ray tube and supplying the signal w1 to the sub picture processor 31.

Figure 1:
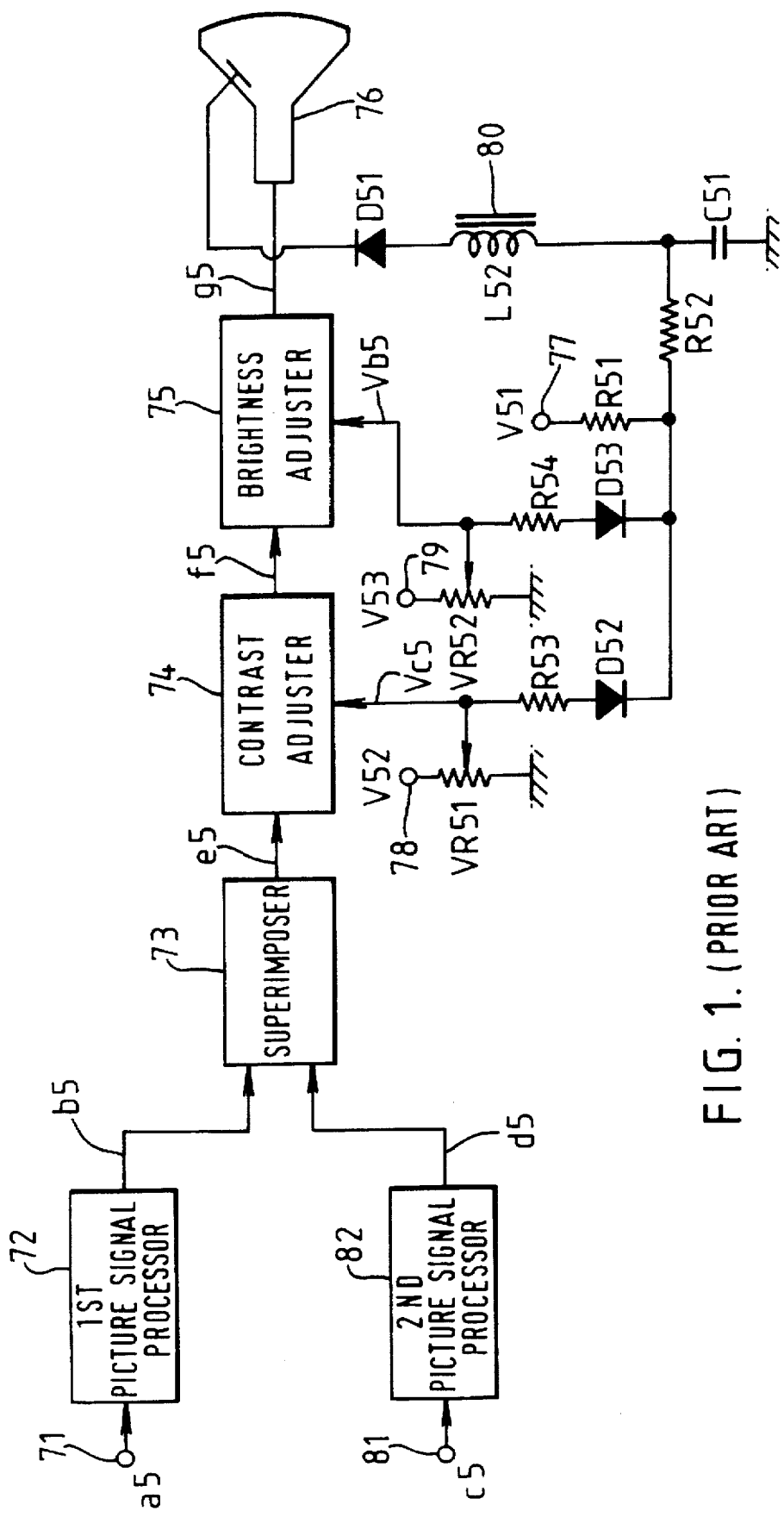
FIG. 1 is a block diagram showing a conventional television receiver.

Further, the contrast/brightness adjusters 211 and 221 each a series connection of a contrast adjuster 74 and a brightness adjuster 75, as shown in FIG. 1. These adjusters 74, 75 are supplied with a contrast adjusting voltage Vc5 and a brightness adjusting voltage Vb5 controlled by a manual operation. Further the control signals t1 and u1 are supplied to at least one of the contrast adjuster 74 and the brightness adjuster 75. While in FIG. 4, the contrast adjuster and the brightness adjuster are represented by the single blocks 211, 221 for convenience of explanation.

Next, the high voltage generating circuit 27 and the ABL detector 28 will be described in detail.

The DC voltage V11 from the power supply line is led to a power supply voltage input terminal 281 of the high voltage generating circuit 27. The power supply voltage input terminal 281 is connected to the anode of the CRT 41 via a series connection of resistors R11, R12 in the ABL detector 28, the secondary winding L12 of a flyback transformer and the anode-to-cathode path of a diode D11. The connection node between the resistor R12 and the secondary winding L12 is connected to the reference potential source via a smoothing capacitor C11.

The connection node between the resistors R11 and R12 is connected to a power supply voltage input terminal 282 supplied with the reference voltage V12 via the anode-to-cathode path of a diode D12 in the ABL detector 28.

The ABL detector 28 generates a voltage representing the variation in the anode current of the CRT 41. When the anode current (referred herein to as ib) is lower than a prescribed value, the current flowing through the resistors R11, R12 of the power supply terminal 281 is limited to a small amount. Thus the voltage drop across the resistor R11 is also limited in a small amount. As a result, the voltage (V11−R11, ib) on the connection node between the resistors R11 and R12, and in turn the anode potential (V12) of the diode D12 presents a level higher than the cathode potential (V12) of the thus causing the diode D12 to be conductive. Accordingly, the voltage on the connection node between resistors R11 and R12 is clamped at the voltage V12 so that the ABL detection voltage q1 is kept to a prescribed value. As a result, no action for suppressing the contrast and the brightness occurs.

On the other hand, when the anode current ib exceeds a prescribed value, the current flowing through the R11, R12 of the power supply terminal 281 increases. Thus the voltage drop across the resistor R11 also increases. As a result, the voltage (V11−R11, ib) on the connection node between the resistors R11 and R12, and in turn the anode potential of the diode D12 lowers below the cathode potential (V12) thus causing the diode D12 to be non-conductive. Accordingly, the voltage on the connection node between resistors R11 and R12 (ABL detection voltage q1) decreases along with the increase of the anode current of the CRT.

By the way, the ABL detector 18 is not limited to the construction as shown in the above embodiments, but it is known to the person skilled in the art that a variety of constructions such as those employing transistors can be utilized.

Next, the controller 23 will be described in more detail.

The detecting voltage q1 of the ABL detector 28 is led to the second input terminals of the combiners 231 and 232. The second input terminals of the combiners 231 and 232 are connected to the movable contact of a variable resistor VR11 constituting the contrast/brightness adjusting volume through the resistor R13. On the other hand, the reference voltage V13 is led to on input terminal 233. The input terminal 233 is connected to the reference potential source through the variable resistor VR11.

The combiners 231 and 237 receive the detecting voltage q1 from the ABL detector 28 and the APL signals r1 and s1 from the APL detectors 212 and 222 as well as the voltage defined by the variable resistor VR11, so as to control the contrast/brightness adjusters 211 and 221 in response to the detecting voltage q1 and the APL signals r1, s1, and also to adjust the contrast and the brightness of the picture signal for main pitcture display region and the sub pitcture display region.

According to such a construction, the principal portion of the embodiment, as shown in FIG. 3, can be embodied with a simple circuit construction.

Figure 2:
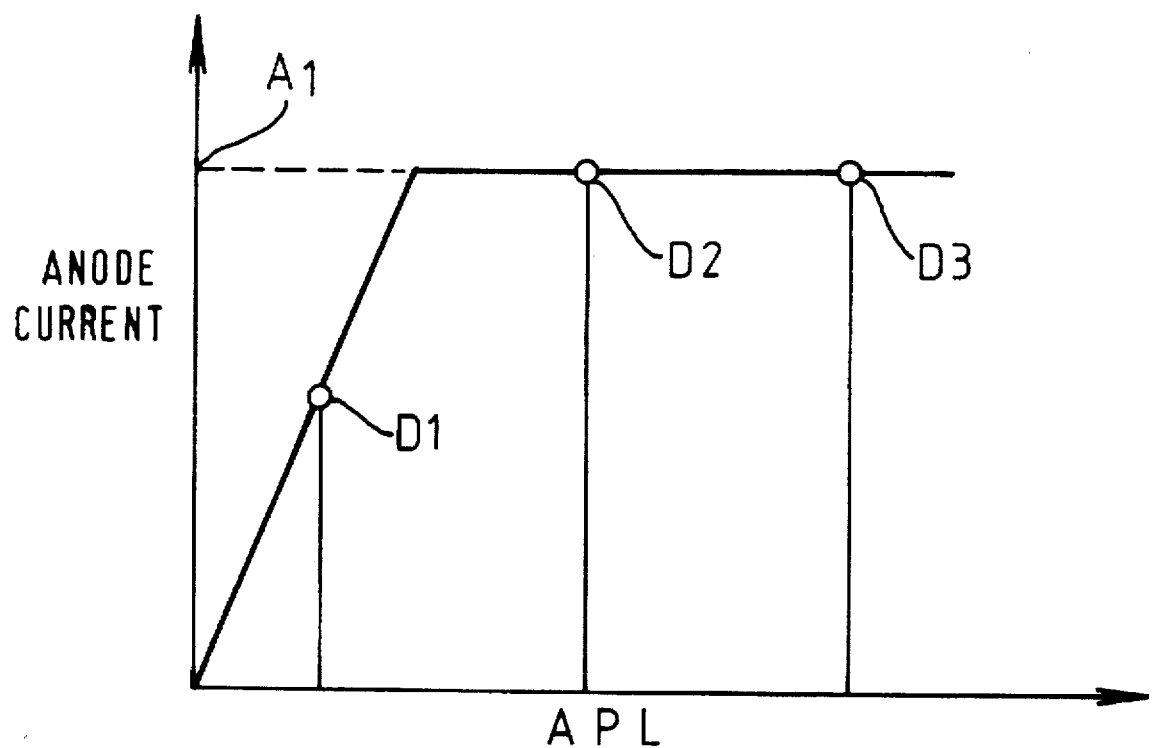
FIG. 2 is a graph showing a relation between an APL and an anode current of a CRT in the conventional television receiver.
Figure 5:
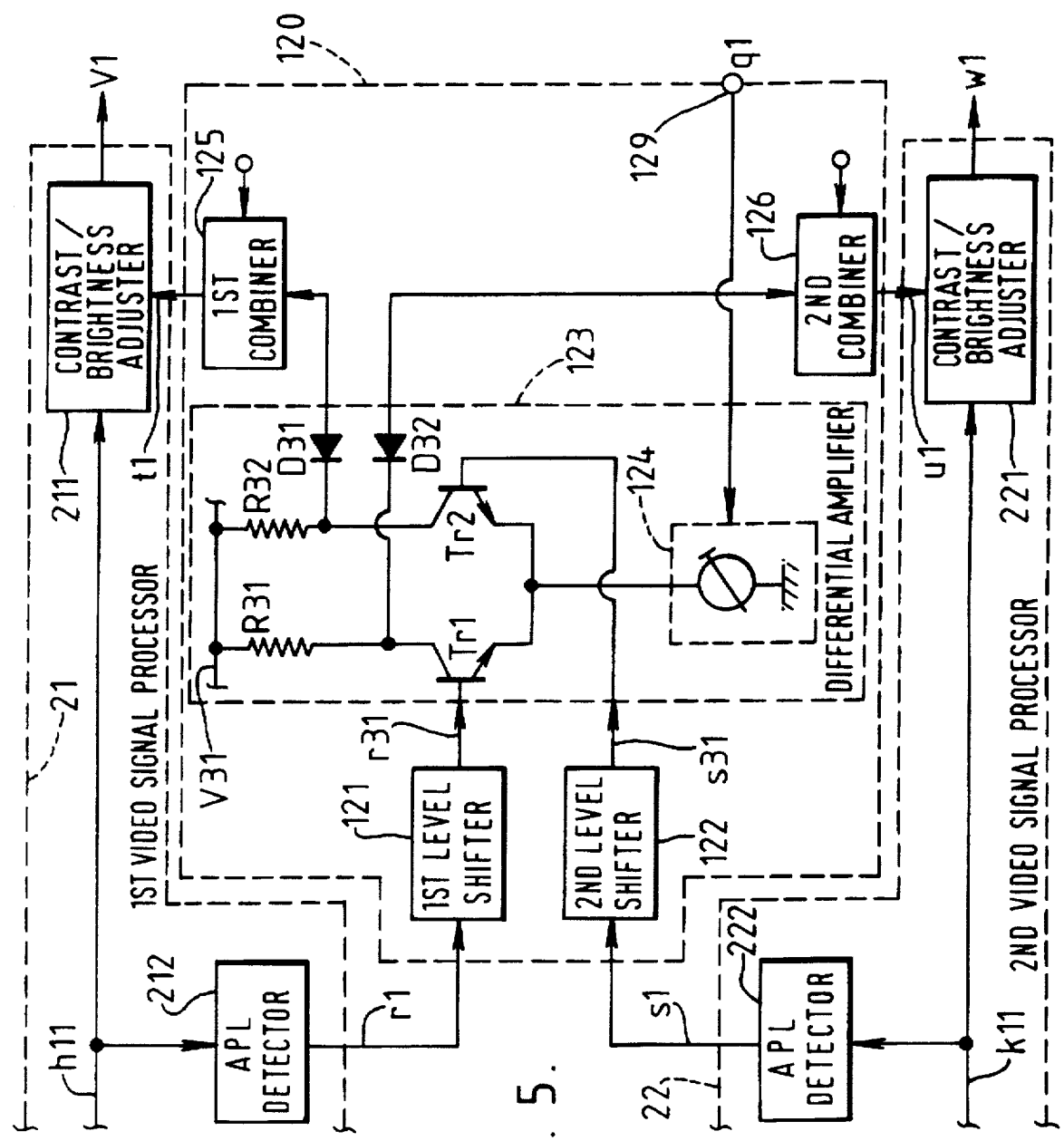
FIG. 5 is a block diagram showing a principal portion of a modification of the embodiment of FIG. 6 in detail.

FIG. 5 is a block diagram showing a principal portion of a modified arrangement of the embodiment of FIG. 3. Some elements in FIG. 5 the same as those in FIGS. 1 and 2 are assigned with the same reference numerals and then explanations thereof being omitted hereinafter.

In FIG. 5, the ABL detection voltage q1 from the detector 28 is led to an input terminal 129 of a controller 120.

First and second level shifters 121 and 122 of the controller 120 respectively perform the level shift of the APL detection voltages r1 and s1 from the detector 212 and 222, and then supply AFL detection voltages r31 and s31 thus obtained to the bases of NPN transistors Tr1 and Tr2 in a differential amplifier 123.

The differential amplifier 123 will be explained in more detail hereinafter.

A power supply line coupled to the direct voltage V31 is connected to one end of a current source 124 via a series connection of a resistor R31 and the collector-to-emitter path of the NPN transistor Tr1, as well as a series connection of a resistor R32 and the collector-to-emitter path of the NPN transistor Tr2. Other end of the current source circuit 124 is connected to the reference potential source. The current source circuit 124 is adjusted its current amount according to the level of the ABL detection voltage q1 from the input terminal 129.

First input terminals of first and second combiners 125 and 126 are respectively connected to the collectors of the NPN transistors TF1 and TF2 via diodes D31 and D32, while second input terminals of them are connected to the input terminal 129. Accordingly, the differential amplifier 123 detects the difference between the APL detection voltages r31 and s31, attenuating the difference thus detected based on the ABL detection voltage q1, and then supplying it to the first input terminals of the first and second combiners 125 and 126.

In this case, the combiners 125 and 126 respectively generate the contrast control signal t1 and the brightness control signal u1 and then supplies the control signals t1 and u1 to the contrast/brightness adjusters 211 and 221 by means of controlling the gain of the voltage supplied to their second input terminals by the voltage supplied to their first input terminals.

According to such a construction, it is possible to provide the invention which can obtain the main picture signal and the sub picture signal which are more well-balanced their contrast and brightness than the embodiment in FIG. 3. Since the difference voltage based on the value accomplished by a result of a division of the difference of APLs between the main picture signal and the sub picture signal by the ABL on the first input terminals of the combiners 125 and 126 operates to adjust the ABL detection voltage q1 based on this differential voltage.

Figure 6:
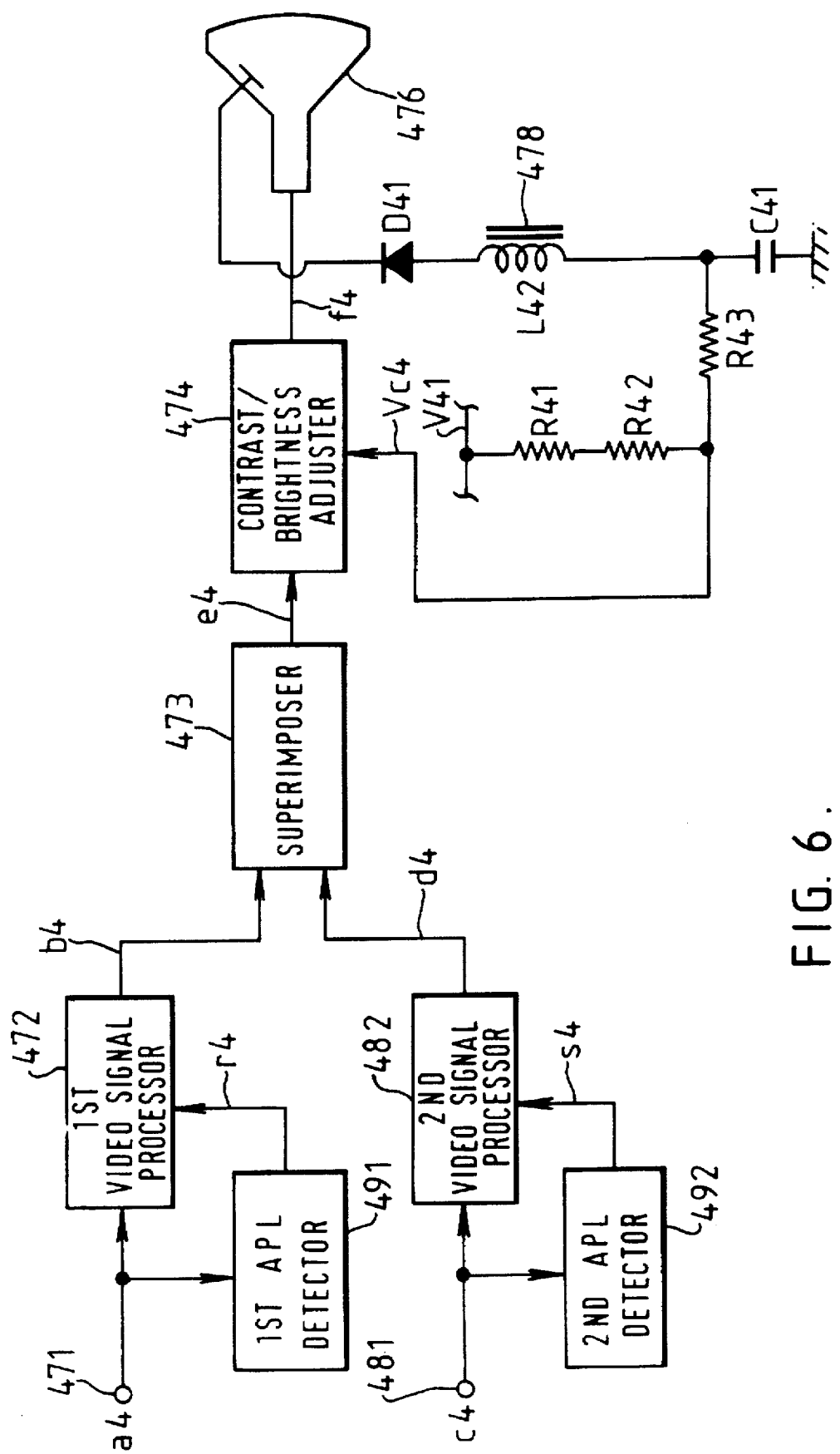
FIG. 6 is a block diagram showing a second embodiment of the television receiver according to the present invention.

FIG. 6 is a block diagram showing another embodiment of the television receiver according to the present invention.

In FIG. 6, the reference numeral 471 denotes an input terminal for receiving a picture signal a4 for the main pitcture display region from a first tuner. The picture signal a4 for the main pitcture display region on the input terminal 471 applied to a first video signal processor 472 and also to a first APL detector 491. The first APL detector 491 performs an APL detection on the picture signal a4 for the main pitcture display region and then supplies an APL detection signal 74 thus obtained to a first video signal processor 472. The first video signal processor 472 performs picture signal processing such as a picture amplification on the picture signal a4 for the main pitcture display region, controlling the gain of the picture signal a4 based on an APL detection signal r4, converting the signal a4 into a picture signal b4 capable of displaying on the cathode ray tube and supplying the signal b4 to a superimposer 473.

On the other hand, a picture signal c4 for a sub pitcture display region received at a second tuner is supplied to an input terminal 481. The picture signal c4 is the applied to a second video signal processor 482 and also to a second APL detector 492. The second APL detector 492 performs the APL detection to the picture signal c4 for the sub pitcture display region and then supplies the APL detection signal to a second video signal processor 482. The second video signal processor 482 performs of a picture signal processing such as the picture amplification to the picture signal c4 for the sub pitcture display region, controlling the gain the signal c4 based on an APL detection signal s4, converting the signal c4 into a picture signal d4 capable of displaying on the cathode ray tube and supplying the signal d4 to the superimposer 473.

The superimposer 476 selectively superimposes the picture signal d4 fop the sub pitcture display region from the second video signal processor 482 on the picture signal b4 for the main pitcture display region from the first video signal processor 472. Then a superimposed picture signal e4 thus obtained is supplied to a contrast/brightness adjuster 474. The contrast/brightness adjuster 474 adjusts the contrast and the brightness of the picture signal e4 from the superimposer processor 473 in using a contrast/brightness adjusting voltage Vc4, which will be described later, supplied to its control voltage input terminal and then supplies it to the cathode of a CRT 476 as a picture signal f4.

On the other hand, a power supply line carrying a DC voltage V41 is connected to the anode of the CRT 476 via a series connection of resistors R41, R42 and R43, a flyback transformer 478, a secondary winding L42 and the anode-to-cathode path of a diode D41. The connection node between the resistor R43 and the secondary winding L42 is connected to a reference potential source via a smoothing capacitor C41. The connection node between the resistors R42 and R43 is connected to a control voltage input terminal of the contrast/brightness circuit 474.

According such a circuit arrangement, a contrast/brightness adjusting voltage Vc4, which is generated based on a current flowing into the CRT 476, is led to the control voltage input terminal of the contrast/brightness adjuster 474.

The operation of the above embodiment will be described hereinafter.

The picture signals a4 and c4 supplied to the input terminals 471 and 481 are independently controlled their gains based on their APLs by the first and second video signal processors 472 and 487. The signals a4 and c4 thus gain controlled are converted into the picture signals b4 and d4 which are possible to be display on the CRT 476, and then converted to the superimposed picture signal e4 at the superimposer 473. The picture signal e4 is contrast/brightness adjusted based on the contrast/brightness adjusting voltage Vc4 by the contrast/brightness adjuster 474, and then displayed on the CRT 476.

In this case, when the picture signal a4 for the main pitcture display region and the picture signal c4 for the sub pitcture display region increase over a limit, the first and second video signal processors 472 and 482 attenuate the one having the larger APL lower then the other having the smaller APL. Then the contrast and the brightness of the superimposed picture signal e4 from the superimposer 473 are controlled by the contrast/brightness adjuster 474. Thus the embodiment can present the same effect as the embodiment, as shown in FIG. 3. Also the embodiment is easy to manufacture since it needs only a little chance in its manufacturing process due to the major part of the embodiment having a similar construction as conventional apparatus as shown in FIG. 1.

Here, the embodiments, as shown in FIGS. 3 and 6 are applied to a type of television receivers which simultaneously displays the main picture and sub picture on one CRT. However, it may be applied to another type of television receivers which displays a plurality of other pictures, for example, four equal-size pictures on the four regions divided in a matrix shape on one CRT.

The present invention provide a television receiver which prevents the contrast and the brightness from worsening lower than it required on the displayed picture of the picture signal which is less varied the average picture level when at least one of average picture levels of the plurality of picture signal varied as a rate different from the others.

As described above, the present invention can provide an extremely preferable television receiver.

While there have been illustrated and described what are at present considered to be preferred embodiments of the present invention, it will be understood by those skilled in the APL that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the beer mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following come or all of the claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A television receiver capable of displaying a picture signal representing first and second picture images on a cathode ray tube, comprising:

means for generating first and second picture signals;

a superimposer for selectively supplying the first and second picture signals to the cathode ray tube;

an APL detector for receiving the first and second picture signals and detecting respective average levels thereof thus producing first and second level detection signals;

an ABL detector for generating a detection voltage responsive to a variation in anode current of the cathode ray tube; and control means for controlling at least one of contrasts and brightnesses of the first and second picture signals by commonly operating on the first and second picture signals in response to the detection voltage from the ABL detector, as well as for independently controlling at least one of contrasts and brightnesses of the first and second picture signals in response to the first and second detection signals from the APL detector.

2. A television receiver capable of simultaneously displaying a picture signal representing first and second picture images on a cathode ray tube, comprising:

means for generating first and second picture signals;

a first APL detector for receiving the first picture signal, detecting an average picture level thereof and producing a first detection signal;

a second APL detector for receiving the second picture signal, detecting an average picture level thereof and producing a second detection signal;

a first picture signal processing means responsive to a first control signal for controlling the first picture signal in a least one of its contrast and brightness;

a second picture signal processing means responsive to a second control signal for controlling the second picture signal in a least one of its contrast and brightness;

a superimposer for selectively supplying the first and second picture signals from the first and second picture signal processing means to the cathode ray tube;

an ABL detector for generating a detection voltage responsive to a variation in an anode current of the cathode ray tube; and a controller for supplying the first control signal responsive to the detection signal from the ABL detector and the first detection signal from the APL detector, as well as for supplying the second control signal responsive to the detection signal from the ABL detector and the second detection signal from the second APL detector.

3. A television receiver as claimed in claim 2, wherein the controller further comprises:

a differential amplifier including first and second transistors having their respective emitters coupled to each other:

means for supplying the base of the first transistor with the first detection signal from the first APL detector;

means for supplying the base of the second transistor with the second detection signal from the second APL detector;

a current source circuit coupled in common to the emitter of the first and second transistors for controlling the current amount in response to the detection voltage from the ABL detector;

means for supplying the first picture signal processing means with the first control signal as a collector output of the first transistor; and means for supplying the second picture signal processing means with the second control signal as a collector output of the second transistor.

4. A television receiver capable of simultaneously displaying first and second picture images on a cathode ray tube, comprising:

means for generating first and second picture signals;

a first APL detector for receiving the first picture signal, detecting an average picture level of the first picture signal and producing a first detection signal in accordance therewith;

a second APL detector for receiving the second picture signal, detecting an average picture level of the second picture signal and producing a second detection signal in accordance therewith;

a first picture signal processing means responsive to the first detection signal for controlling a gain of the first picture signal;

a second picture signal processing means responsive to the second detection signal for controlling a gain of the second picture signal;

a superimposer for selectively supplying the first and second picture signals from the first and second picture signal processing means to the cathode ray tube;

an ABL detector for generating a detection signal responsive to a variation in an anode current of the cathode ray tube; and a controller for controlling at least one of a contrast and a brightness of an output picture signal from the superimposer in response to the detection signal from the ABL detector.

* * * * *